United States Patent
Marz

Patent Number: 5,761,846
Date of Patent: Jun. 9, 1998

[54] UNDERGROUND IRRIGATION DEVICE

[76] Inventor: Richard F. Marz, 915 E. Inman St., Statesboro, Ga. 30458

[21] Appl. No.: 523,404

[22] Filed: Sep. 5, 1995

[51] Int. Cl.$^6$ ................................................ A01G 29/00
[52] U.S. Cl. ........................................................ 47/48.5
[58] Field of Search ........................ 47/48.5 G, 48.5; 111/7.1

[56] References Cited

U.S. PATENT DOCUMENTS

| | | | |
|---|---|---|---|
| 588,278 | 8/1897 | Kling | 47/48.5 |
| 1,280,486 | 10/1918 | Kanst | 47/48.5 G |
| 1,394,041 | 10/1921 | Robbins | 47/48.5 |
| 1,925,622 | 9/1933 | Anderson | 111/7.1 |
| 1,984,265 | 12/1934 | Hamer | 111/7.1 |
| 2,145,934 | 2/1939 | Kingman | 47/48.5 X |
| 2,791,347 | 5/1957 | Boehm | 220/484 X |
| 3,118,402 | 1/1964 | Nelson | 47/48.5 X |
| 3,303,800 | 2/1967 | Young | 111/7.1 |
| 3,460,562 | 8/1969 | Moulder | 47/48.5 G |
| 3,613,310 | 10/1971 | Rynberk | 47/48.5 G |
| 3,754,352 | 8/1973 | Bates | 47/48.5 |
| 4,207,705 | 6/1980 | Errede et al. | 47/48.5 |
| 4,432,291 | 2/1984 | Shirley | 111/7.1 |
| 4,453,343 | 6/1984 | Grimes, Sr. | 47/48.5 |
| 4,753,394 | 6/1988 | Goodman | 47/48.5 G |
| 5,016,548 | 5/1991 | Ito | 47/48.5 G |
| 5,172,515 | 12/1992 | Lapshansky, Sr. et al. | 47/48.5 G |

FOREIGN PATENT DOCUMENTS

| | | | |
|---|---|---|---|
| 1176262 | 4/1959 | France | 47/48.5 G |
| 2249463 | 5/1992 | United Kingdom | 47/48.5 G |
| 2272142 | 5/1994 | United Kingdom | 47/48.5 |

*Primary Examiner*—Michael J. Carone
*Assistant Examiner*—Joanne C. Downs
*Attorney, Agent, or Firm*—Michael A. Mann

[57] ABSTRACT

An underground irrigation device comprises a chamber dimensioned to accept a quantity of pesticide, insecticide or fertilizer, a cap secured to the chamber and having a fitting for receiving a garden hose, and a removable accelerator conduit depending from the cap and positioned within the interior of the chamber. The accelerator conduit has at least one hole in fluid communication with the interior of the chamber, which causes the acceleration of water into the chamber interior. A portion of the chamber's perimeter is fitted with a plurality of throughholes, while the chamber's interior is lined with a filter material to prevent the ingrowth of grass and roots and the intrusion of dirt as well as allowing for diffusion of pesticides and fertilizers and pressure nitigated effluent. Water from the hose enters the accelerator conduit and is accelerated turbulently through its throughhole to agitate and dissolve the pesticide, insecticide or fertilizer before being passed from the chamber in the direction dictated by the chamber's thoughholes.

19 Claims, 2 Drawing Sheets

U.S. Patent Jun. 9, 1998 Sheet 1 of 2 5,761,846
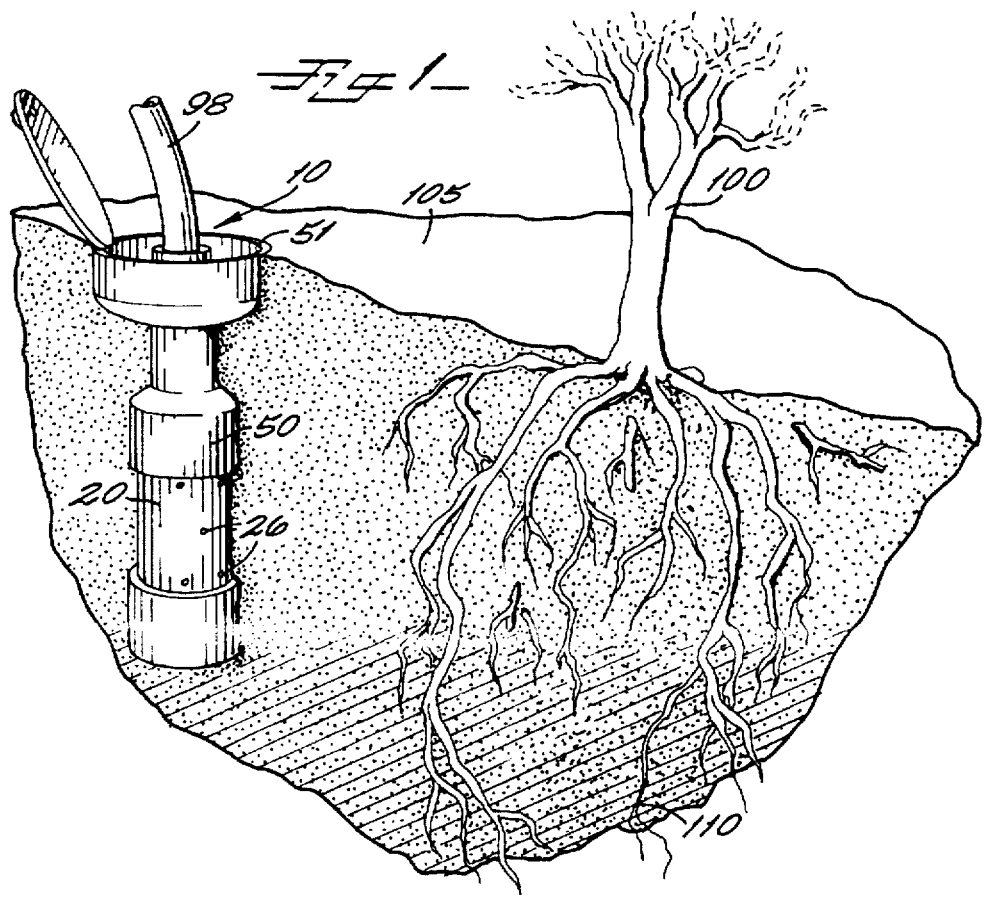
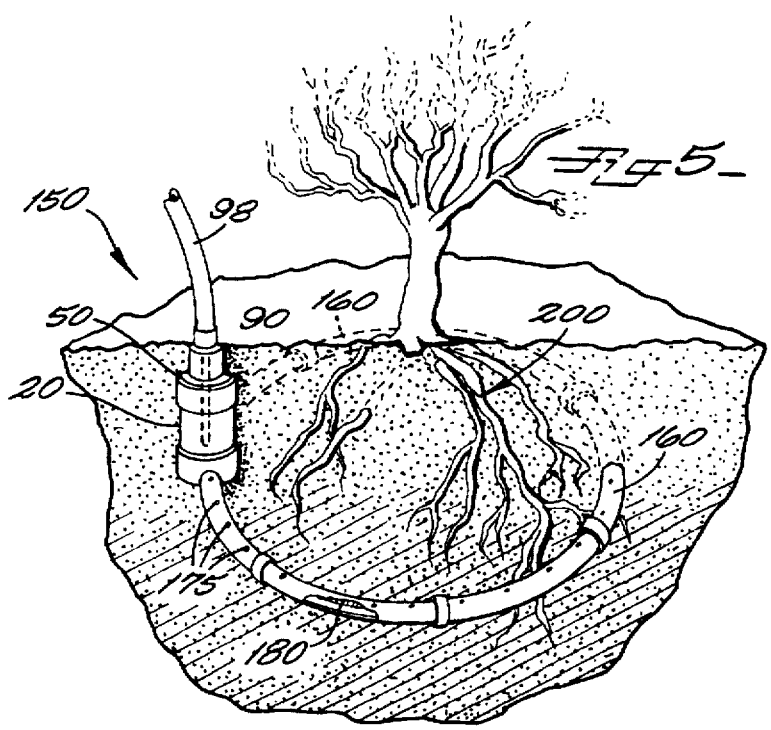

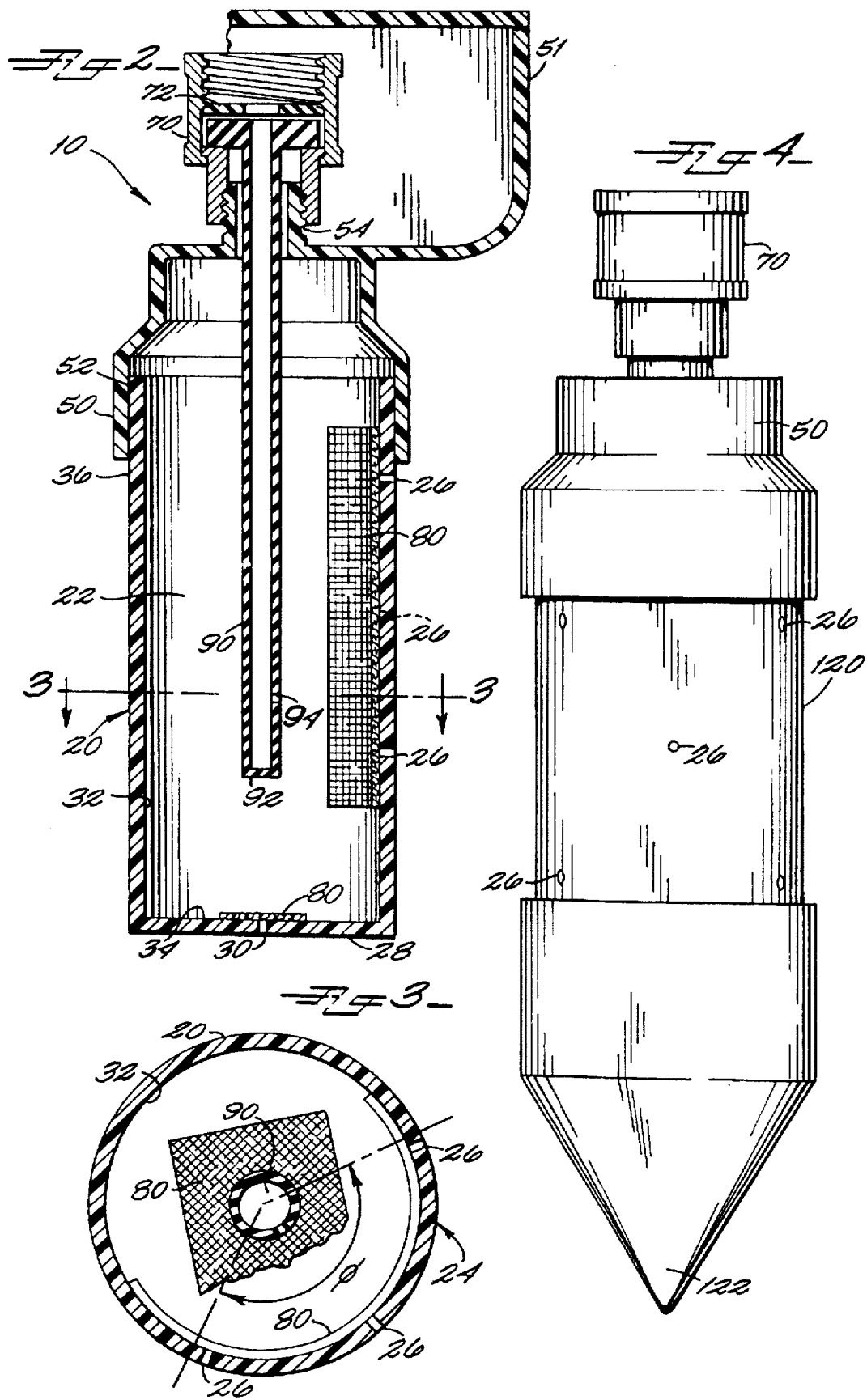

UNDERGROUND IRRIGATION DEVICE

BACKGROUND OF THE INVENTION

1. Field of the Invention

The present invention relates to devices for use in irrigating trees and shrubbery. More specifically, the present invention provides a device enabling controlled, underground irrigation of trees and shrubs.

2. Discussion of Background

Several variables reduce the efficiency of above-ground irrigation and feeding of trees, shrubs and large plants. First, since most watering and feeding takes place when the temperature is warm or hot, a portion of the fluid evaporates before it can be absorbed by the root system. Evaporation is also more pronounced when the soil is very dense. Dense soil prohibits rapid percolation of fluid, and, as a result, the fluid forms puddles on the soil surface. These puddles are exposed to the atmosphere for greater time periods and are thus more susceptible to evaporation. Also, there is a significant amount of runoff of the water due to an unleveled soil surface. Evaporation and runoff results in ineffective irrigation and feeding of plants and, in addition, wastes water.

Secondly, watering the soil around trees and shrubs growing in planters poses a related problem. The area of soil in the planter may have to be thoroughly soaked to get enough water to percolate down to the roots of the plant. This saturation technique often provides too much water, which in turn diminishes the health of the plant's root system, and if continued, eventually kills the plant.

Consequently, there exists a need for a subterranean irrigation system enabling controlled, precise irrigation of a large plant, tree or shrub.

SUMMARY OF THE INVENTION

According to its major aspects and broadly stated, an underground irrigation device according to a preferred embodiment of the present invention comprises a chamber dimensioned to receive a charge of insecticide, pesticide or fertilizer, a cap with a rotatable lid which fits over the top of the chamber, a fitting that extends from the interior of the cap and is formed to threadably receive a garden hose, and an accelerator conduit connected to the fitting and that depends from the cap into the interior of the chamber. The accelerator conduit contains a lateral hole in fluid communication with the interior of the chamber. Disposed about the perimeter of the chamber is a plurality of lateral throughholes that pass fluid from the interior of the chamber to the surrounding soil. Preferably, these holes are deployed about only a portion of the chamber's perimeter. The interior of the chamber is lined with a filter which prevents the entrance of dirt, grass and leaves and also allows for the diffusion of pesticides and fertilizers and reduces the pressure of the fluid emitted from the interior of the chamber. The present invention may be manufactured in any size, thereby accommodating any size root system. An alternative preferred embodiment has a plurality of pipe sections connected to the chamber which, when placed below ground, surrounds a root system and permits 360° irrigation of a tree or shrub.

In use, the accelerator conduit is removed from the chamber and a quantity of pesticide, insecticide or fertilizer is placed within the interior of the chamber. The accelerator conduit is then replaced while a garden hose is attached to the fitting. The device is thereafter left in the ground at the proper depth, leaving the fitting at ground level. Water conducted by the garden hose enters the accelerator conduit and is accelerated turbulently therefrom into the chamber's interior. Water within the interior of the chamber mixes with the pesticide, insecticide or fertilizer, and is subsequently directed from the interior of the chamber via the throughholes positioned about the perimeter of the chamber.

A major feature of the present invention is the accelerator conduit having at least one throughhole placed laterally therethrough. The small size of the throughhole under pressure substantially accelerates the fluid and creates turbulent fluid flow within the chamber and agitates its contents, thereby ensuring a homogeneous mixture.

Another major feature of the present invention is the filter that lines the interior of the chamber. This filter acts to protect the interior of the chamber from both the ingrowth of grass and roots and the intrusion of dirt. The filter also acts to allow slower diffusion of water and nutrients from the chamber.

The lateral throughholes positioned about limited portions of the perimeter of the chamber, preferably a 135° angle, is still another feature of the present invention. Concentrating fluid flowing from the chamber to a particular area enables the root system to be specifically targeted, thereby maximizing the effects of irrigation and minimizing the consumption of water and the cost of fertilizer, pesticides or insecticides.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a device according to a preferred embodiment of the present invention, shown below ground, proximate to a root system;

FIG. 2 is a cross sectional side view of a device according to a preferred embodiment of the present invention;

FIG. 3 is a cross sectional top view of a device according to a preferred embodiment of the present invention;

FIG. 4 is side view of a device according to an alternative embodiment of the present invention; and FIG. 5 is a partially ghosted, perspective view of a device according to another alternative embodiment of the present invention shown below ground, proximate to a root system.

DETAILED DESCRIPTION OF A PREFERRED EMBODIMENT

Attention is now directed to FIG. 1 and FIG. 2, which show perspective and cross sectional side views, respectively, of an underground irrigation device according to a preferred embodiment of the present invention generally designated by reference numeral 10. Device 10 is comprised of a chamber 20, a cap 50 having a rotatable lid 51, a fitting 70, a filter 80, and an accelerator conduit 90. Chamber 20 and cap 50 may be made of any durable, non-corrosive material. Preferably, chamber 20 and cap 50 are made of polyvinyl chloride.

Chamber 20 is dimensioned so that interior 22 will accept a charge of pesticide, insecticide or fertilizer (not shown). Formed about perimeter 24 of chamber 20 is a plurality of throughholes 26. Throughholes 26 are dimensioned so that fluid can exit interior 22 of chamber 20 at the same rate that it enters interior 22, as will be explained in more detail below.

As is illustrated in FIG. 3, throughholes 26 are formed about an angle φ of perimeter 24. It is preferred that angle φ be approximately 135°. Forming throughholes 26 about a 135° angle of perimeter 24 enables the flow pattern of fluid expelled from device 10 to be specifically targeted toward root system 110, shown in FIG. 1.

Preferably, bottom 28 of chamber 20 is formed with at least one throughhole 30. When the supply of fluid to interior 22 of chamber 20 is terminated, throughhole 30 permits drainage from chamber 20 of any residual fluid existing in interior 22 to thereby prevent freezing of the water and cracking of chamber 20 in the winter.

Filter 80 is placed about the interior wall 32 and floor 34 of chamber 20, and can be affixed thereto by any means commonly employed in the art. Preferably, a chemically non-reactive adhesive is used to affix filter 80 to interior wall 32 and floor 34. Moreover, it is sufficient for filter 80 to line only the section of interior wall 32 having throughholes 26 and bottom floor 34 having throughholes 30.

Filter 80 may be any non-degradable, chemically inert material which is semi-permeable, to thereby allow fluid to exit chamber 20, yet has sufficient density to prevent the ingrowth of roots and grass into chamber 20. Such materials include, but are not limited to, nylon, polyester, geotextiles, and synthetic fabrics.

Cap 50 is dimensioned so that inner wall 52 frictionally engages outer wall 36 of chamber 20 to provide a secure fit. It is appreciated that cap 50 may be secured to chamber 20 by other means commonly employed in the art without departing from the spirit and scope of the present invention. For example, chamber 20 may be secured to cap 50 by a threading arrangement. A thread 54 extending from cap 50 matingly engages fitting 70. Fitting 70 is dimensioned to receive a hose 98, shown in FIG. 1.

Supported by fitting 70 and depending through thread 54 into interior 22 of chamber 20 is accelerator conduit 90. An O-ring 72 is positioned above accelerator conduit 90 and within fitting 70. Proximate to bottom 92 of conduit 90 is at least one throughhole 94. Throughhole 94 is in fluid communication with interior 22 of chamber 20 and is dimensioned so that water traveling through conduit 90 is accelerated through throughhole 94 into interior 22 with turbulence.

To use device 10, lid 51 is rotated away from cap 50. Thereafter, O-ring 72 and accelerator conduit 90 are removed from chamber 20 and a quantity of pesticide or fertilizer is placed in interior 22 if desired. O-ring 72 and accelerator conduit 90 are then replaced within fitting 70. Device 10 is left in ground 105 with fitting 70 remaining at ground level with angle φ of perimeter 24 facing root system 110. To aid in the insertion of device 10 into ground 105, an alternative preferred embodiment has a chamber 120 having a tapering bottom 122, as illustrated in FIG. 4. Hose 98 is then placed in engagement with fitting 70.

The distance device 10 is positioned from root system 110 depends on the type of plant, its height, its maturity, its root system, and most importantly, the soil type; and therefore, the positioning of device 10 will require a modest amount of experimentation. For example, soils having a large clay content are usually dense and therefore the rate of percolation is low. With such soil, device 10 should be placed closer to root system 110. In contrast, siliceous or sandy soils are usually less dense and allow water to percolate more easily, and consequently, device 10 can be placed farther from root system 110.

When the water is turned on, hose 98 conducts it into conduit 90. The water will travel the distance of conduit 90 and be turbulently accelerated through throughhole 94 into interior 22. The turbulent flow of water into interior 22 will agitate the pesticides or fertilizers contained therein to dissolve them or uniformly suspend particles in the fluid mixture. The mixture will then travel through filter 80 and be expelled from interior 22 through throughholes 26 and 30.

As fluid flows through throughholes 26 and 30 as quickly as it does through throughhole 94, interior 22 of chamber 20 will not become filled with water and consequently, the water accelerated from conduit 90 will continue to agitate and dissolve the fertilizer or pesticide. An artisan with ordinary skill in the art can maintain this state of equilibrium by verifying that the cross sectional area of throughholes 26 and 30 of chamber 20, multiplied by the pressure on interior wall 32 of chamber 20, is approximately equal to the cross sectional area of throughholes 94 of conduit 90 times the pressure on the interior surface of conduit 90.

Maintenance of this flow results in the controlled release of the homogenized mixture of fertilizer/pesticide fluid to the surrounding soil. For illustrative purposes only and in combination with a garden hose having a water pressure of approximately 50 PSI, a flow rate of approximately 10 gallons per hour can be achieved by a device 10 having the following dimensions: chamber 20 having a diameter of 2 inches and a length of 5.25 inches, eight throughholes 26 each having a diameter of approximately 0.047 in. and one throughhole 30 having a diameter of approximately 0.047 in.; a conduit 90 having a diameter of 0.25 in., length 7.5 in. and a single throughhole 94 with a diameter of approximately 0.025 in.

It is appreciated that for larger trees or shrubs, more than one device 10 may be used to provide proper irrigation. Additionally, device 10 may be partially curved or chamber 20 extended in order to irrigate particular root systems. Furthermore, device 10 may be interfaced with an in-ground lawn sprinkler system to gain maximum tree and shrub irrigation without excessive above ground watering, thereby minimizing the amount of water lost by runoff.

An alternative preferred embodiment is shown in FIG. 5. Here, device 150 has a series of arcuate pipe sections 160 that fit together to form a ring about root system 200. When in place, sections 160 are in fluid communication with interior 22 of chamber 20. A plurality of throughholes 175 are formed in sections 160 and are oriented to face root system 200. A filter 180 lines the interiors of pipe sections 160. In use, a charge of pesticide or fertilizer is placed is chamber 20. Water traveling through garden hose 98 is accelerated through throughhole 94 in conduit 90 and is introduced into chamber 20, where it mixes with the fertilizer or pesticide to form a mixture. Thereafter, the mixture travels through sections 160 and is dispersed through throughholes 175 toward root system 200.

It will be apparent to those skilled in the art that many changes and substitutions can be made to the preferred embodiment herein described without departing from the spirit and scope of the present invention as defined by the appended claims.

What is claimed is:

1. An underground irrigation device for use with a hose, said hose conducting water at a flow rate, said device comprising:

a chamber having a top and an opposing bottom, an interior and a perimeter, said perimeter having a plurality of throughholes disposed laterally therethrough, said throughholes allowing fluid communication between said interior of said chamber and the exterior of said device;

a cap attached to said top of said chamber, said cap having an interior;

a fitting extending from said interior of said cap, said fitting dimensioned to receive said hose so that said hose can be connected to said chamber; and accelerator means for creating a turbulent flow of water within the interior of said chamber, said accelerator means being positioned in said interior of said chamber so that said accelerator means receives water from said hose through said fitting.

2. The device as recited in claim 1, wherein said accelerating means further comprises a conduit having an interior, a top and an opposing bottom, said interior of said conduit being in fluid communication with said hose when said hose is received by said fitting, said conduit having at least one hole laterally disposed therethrough so that said interior of said conduit is in fluid communication with said interior of said chamber.

3. The device as recited in claim 1, wherein said device further comprises a filter, said filter positioned in said interior of said chamber over said throughholes of said chamber.

4. The device as recited in claim 1, wherein said plurality of throughholes formed in said perimeter of said chamber are deployed over approximately 135° of said perimeter of said chamber.

5. The device as recited in claim 1, wherein said bottom of said chamber is tapered.

6. The device as recited in claim 1, wherein said chamber and said cap are made of polyvinyl chloride.

7. The device as recited in claim 1, wherein at least one hole is formed in said bottom of said chamber to provide fluid communication between said interior of said chamber and the exterior of said device.

8. The device as recited in claim 1, wherein said cap further comprises a rotatable lid.

9. An underground irrigation device, said device for use with a hose, said hose emitting water at a flow rate, said device comprising:

a chamber, said chamber having a top and an opposing bottom, an interior and a perimeter, said perimeter having a plurality of holes formed therethrough, said holes permitting fluid communication between said interior of said chamber and the exterior of said device, said bottom of said chamber having at least one drain hole formed therein to permit fluid communication between said interior of said chamber and the exterior of said device;

a cap attached to said top of said chamber, said cap having an interior;

a fitting extending from said interior of said cap, said fitting dimensioned to receive said hose;

accelerator means carried within said chamber for creating turbulent flow within said chamber by restricting the flow of water received from said hose into said chamber; and a filter positioned in said interior of said chamber about said perimeter and said bottom of said chamber.

10. The device as recited in claim 9, wherein said accelerator means further comprises a conduit having an interior, a top and an opposing bottom, said interior of said interior of said conduit being in fluid communication with said hose when said hose is received by said fitting, said conduit having at least one hole formed therein so that said interior of said conduit is in fluid communication with said interior of said chamber.

11. The device as recited in claim 9, wherein said holes formed in said perimeter of said chamber are deployed about approximately 135° of said perimeter of said chamber.

12. The device as recited in claim 9, wherein said chamber and said cap are made of polyvinyl chloride.

13. The device as recited in claim 9, wherein said bottom of said chamber is tapered.

14. The device as recited in claim 9, wherein said cap further comprises a rotatable lid.

15. An underground irrigation device, said device for use with a hose, said hose emitting water at a flow rate, said device comprising:

a chamber, said chamber having a top and an opposing bottom, an interior and a perimeter;

a cap attached to said top of said chamber;

a fitting extending from said cap, said fitting dimensioned to removably receive said hose;

accelerator means for creating a turbulent flow of water within the interior of said chamber, said accelerator means being positioned in said chamber so that said accelerator means receives water from said hose through said fitting; and a plurality of connected pipe sections, each pipe section having an arcade shape, each pipe section having an interior, said plurality of pipe sections in fluid communication with said interior of said chamber, each pipe section of said plurality of pipe sections having at least one throughhole formed therethrough.

16. The device as recited in claim 15, wherein said accelerator means further comprises a conduit having a top and an opposing bottom, said conduit being in fluid communication with said hose when said hose is received by said fitting, said conduit having at least one hole laterally disposed therethrough, said at least one hole being in fluid communication with said interior of said chamber.

17. The device as recited in claim 15, wherein said chamber and said cap are made of polyvinyl chloride.

18. The device as recited in claim 15, wherein said bottom is formed to have at least one hole, said at least one hole being in fluid communication with said interior of said chamber.

19. The device as recited in claim 15, further comprising a filter, said filter positioned about said interior of said each pipe section of said plurality of pipe sections.

* * * * *